United States Patent [19]
Ohki et al.

[11] Patent Number: 5,928,679
[45] Date of Patent: Jul. 27, 1999

[54] ELASTOMERIC EXTRUDING APPARATUS

[75] Inventors: Masahiko Ohki; Shuichi Yamamori, both of Toyota, Japan

[73] Assignee: Sumitomo Rubber Industries, Ltd., Hyogo-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/678,702

[22] Filed: Jul. 11, 1996

[30] Foreign Application Priority Data

Jul. 13, 1995 [JP] Japan ................................ 7-177673
Jul. 13, 1995 [JP] Japan ................................ 7-177674

[51] Int. Cl.$^6$ ..................................................... B29C 47/32
[52] U.S. Cl. ................. 425/327; 264/173.1; 264/173.16; 264/175; 264/177.16; 425/131.1; 425/133.5; 425/194; 425/374; 425/376.1; 425/381; 425/462
[58] Field of Search .............................. 425/131.1, 133.5, 425/141, 192 R, 327, 376.1, 374, 194, 381, 462; 264/173.1, 175, 173.14, 173.16, 177.16

[56] References Cited

U.S. PATENT DOCUMENTS

| | | |
|---|---|---|
| 3,871,810 | 3/1975 | Geyer ........................................ 425/374 |
| 4,526,528 | 7/1985 | Kline et al. ............................ 425/133.5 |
| 4,539,169 | 9/1985 | Nixon et al. ........................... 425/131.1 |
| 4,650,618 | 3/1987 | Heinemann et al. ................. 425/133.5 |
| 4,653,994 | 3/1987 | Capelle .................................. 425/131.1 |
| 4,683,095 | 7/1987 | Tolonen et al. ....................... 425/131.1 |
| 4,744,745 | 5/1988 | Harada et al. ............................ 425/374 |
| 4,911,631 | 3/1990 | Harada et al. ............................ 425/374 |
| 5,234,647 | 8/1993 | Harada et al. ............................ 425/374 |

FOREIGN PATENT DOCUMENTS 3521643 7/1986 Germany.
1230869 5/1971 United Kingdom.

OTHER PUBLICATIONS

Kautschuk und Gummi, vol. 37, No. 6, Jun. 1994, Heidelberg, Deutschland, pp. 505–508.

*Primary Examiner*—Patrick Ryan
*Assistant Examiner*—Joseph Leyson
*Attorney, Agent, or Firm*—Birch, Stewart, Kolasch & Birch, LLP

[57] ABSTRACT

An elastomeric extruding apparatus having a head, to which a plurality of extruders are coupled, and a rotatable, driven roller disposed at the front end of the head so as to form an extruding space between the roller and the head. The head is provided with a passage arrangement, through which the elastomeric materials pass, eventually opening into the extruding space. The extruding space has a uniform chamber extending from the opening of the passage arrangement and a finishing chamber communicating with the uniform chamber for shaping the elastomer into its final sectional shape.

10 Claims, 17 Drawing Sheets

5,928,679

ELASTOMERIC EXTRUDING APPARATUS

BACKGROUND OF THE INVENTION

The present invention relates to an elastomeric extruding apparatus capable of forming elastomeric products formed in multiple layers by a plurality of extruders at high precision, and more particularly and advantageously used for forming thin products.

FIELD OF THE INVENTION

To form elastomeric products having multiple layers by laminating a plurality of elastomeric materials having different properties, a multiplex extruding apparatus comprising a plurality of extruders is used.

Such a multiplex extruding apparatus is disclosed, for example, in German patent number DE 3521643, wherein elastomeric materials are extruded from a plurality of extruders and discharged through one nozzle to continuously form a plurality of layers of bands.

However, when formed by using an apparatus of such a construction, for example, when forming thin elastomeric products such as a rubber inner-liner of a pneumatic tire, it is difficult to obtain the dimensions and precision in the elastomeric products.

On the other hand, U.S. Pat. No. 4,683,095 discloses, as shown in FIG. 18, an apparatus provided with a roll at the extrusion end of the apparatus, for enhancing product precision, especially thickness precision.

This apparatus has a convergent passage F in which elastomeric materials E1, E2 extruded from the extruders are joined at a convergent point P disposed in the midst of the die and advanced while laminating, and a finishing chamber G composed of a tiny gap between head H and roller R0 is provided at the downstream side of the convergent passage F.

In the convergent passage F, however, the two elastomers E1, E2 advance nearly at same speed, but in the finishing chamber G, the lower elastomeric material E2 contacts with the roller R0, and is hence pulled by the rotation of the roller R0, and fed at a faster speed V2 than the speed V1 of the upper elastomer E1.

In particular, when the convergent passage F and finishing chamber G are directly coupled, the flow direction changes abruptly near the inlet of the finishing chamber G, and the sectional area of the finishing chamber G becomes narrow, and hence the passing resistance received from the head H is increased. As a result, the speed difference further increases, and distortion occurs between the two elastomers E1, E2, and a misalignment is likely to occur in the dimensions of the extruded products. In this apparatus, moreover, since the passing resistance is large, a relatively high pressure must be applied in order to extrude the elastomers from the finishing chamber G, and when the pressure difference between the inside and outside of the apparatus is high, the expansion of the elastomer after extruding increases, and hence the product precision is spoiled.

SUMMARY OF THE INVENTION

It is hence a primary object of the present invention to provide an elastomeric extruding apparatus utilizing a uniform chamber with a relatively large sectional height, between the opening of the passage and the finishing chamber, so as to decrease the passing resistance received from the head, enhance the precision, even in thin elastomeric products, and form products of high quality while maintaining stability of strength, without causing interlayer separation of the elastomers.

According to one aspect of the present invention, an elastomeric extruding apparatus comprises a head to which plural extruders for extruding elastomeric material are linked, and a rotatable driven roller is disposed at a front end of the head so as to form an extruding space between the roller and the front end of the head, wherein the head has a passage arrangement through which the elastomeric materials pass from the extruders, said passage arrangement having an opening communicating with the extruding space, and the extruding space has a uniform chamber through which the elastomeric materials flow from the convergent passage opening while laminating and advance in the rotating direction together with the roller, and a finishing chamber is provided which communicates with the uniform chamber and forms the elastomer substantially into a final sectional shape by reducing the sectional height from the uniform chamber.

The uniform chamber is preferred to have a principal part which is substantially uniform in sectional shape and extends from the opening to the finishing chamber. Further, a length L of the principal part of the uniform chamber is preferably at least 1.5 times the sectional height T of the principal part.

The passage arrangement may comprise a plurality of individual passages through which the elastomeric materials from each extruders pass individually, and one convergent passage extending from a convergent point of said plural individual passages and through which the elastomeric materials of the individual passages pass while laminating.

Also, the passage arrangement may comprise plural individual passages, through which the elastomeric materials from each extruder pass, opening into the extruding space individually. In this case, the principal part of the uniform chamber is formed between the finishing chamber and the opening closest to the finishing chamber among the openings of the plural individual passages.

BRIEF DESCRIPTION OF THE DRAWINGS

An embodiment of the present invention will now be described, by way of example, referring to the attached diagrammatic drawings, in which:

FIG. 3 (B) is a sectional view showing the passage arrangement and extruding space together with the elastomer materials;

FIG. 7 (B) is a sectional view showing a sectional shape of elastomeric material in an convergent passage;

FIG. 7 (C) is a sectional view showing a sectional shape of elastomeric material in a uniform chamber;

FIG. 11 (B) is a sectional view showing the passage arrangement and extruding space together with the elastomeric materials of the second embodiment;

FIG. 15 (B) is a sectional view showing a sectional shape of elastomeric material in a guide passage of the second embodiment;

FIG. 15 (C) is a sectional view showing a sectional shape of elastomeric material in a uniform chamber of the second embodiment;

DETAILED DESCRIPTION OF THE INVENTION

FIG. 1 to FIG. 7 (C) show a first embodiment of the present invention.

Figure 1:
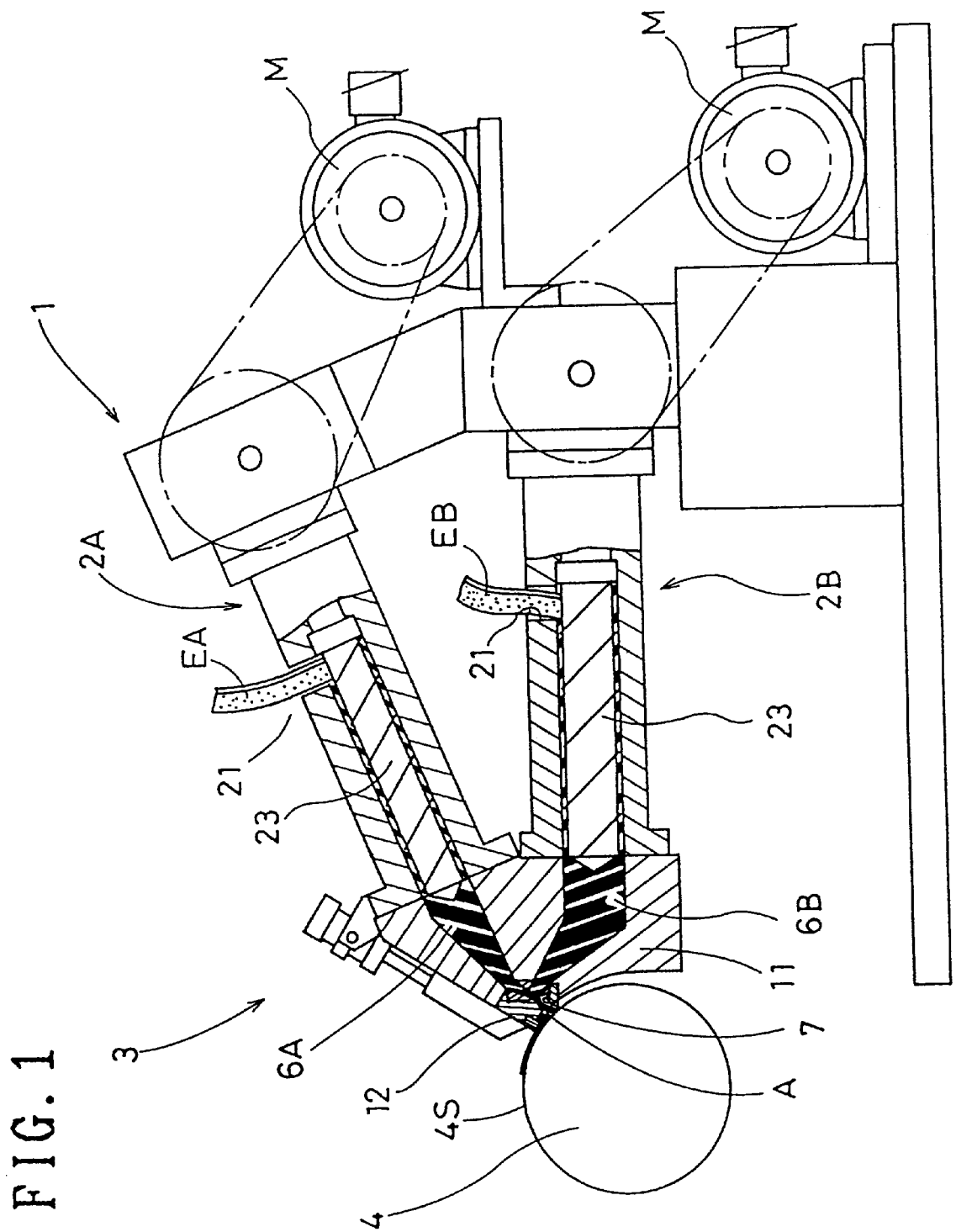
FIG. 1 is a front view showing an elastomeric extruding apparatus in a first embodiment of the present invention.

In a first embodiment, an elastomeric extruding apparatus 1 comprises, as shown in FIG. 1, a plurality, in this case two extruders 2A, 2B for extruding elastomeric materials EA, EB, a head 3 to which these extruders 2A, 2B are coupled, and a roller 4 disposed at a tiny clearance at the head 3 so as to form an extruding space A between an outer circumference 4S of the roller 4 and a front end of the head 3.

The two extruders 2A and 2B are structured alike, and are disposed so as to cross obliquely within a vertical plane, and each end is fixed to the head 3. The extruders 2A, 2B are designed with a known construction for kneading and fusing the elastomer materials EA, EB charged from an injection port 21 by the rotation of a screw shaft 23 driven through a gear reducer by a motor M, and discharged toward the head 3.

The head 3 comprises a base part 11 on which the extruders 2A, 2B are mounted, and a die set 12 detachably fitted to the leading end of the base part 11. The head 3 has a passage arrangement 5 communicating with the extruders 2A, 2B and extending forward by penetrating through the base part 11 and die set 12, and the front end of the passage arrangement 5 forms an opening 9 communicating with the extruding space A.

Figure 3A:
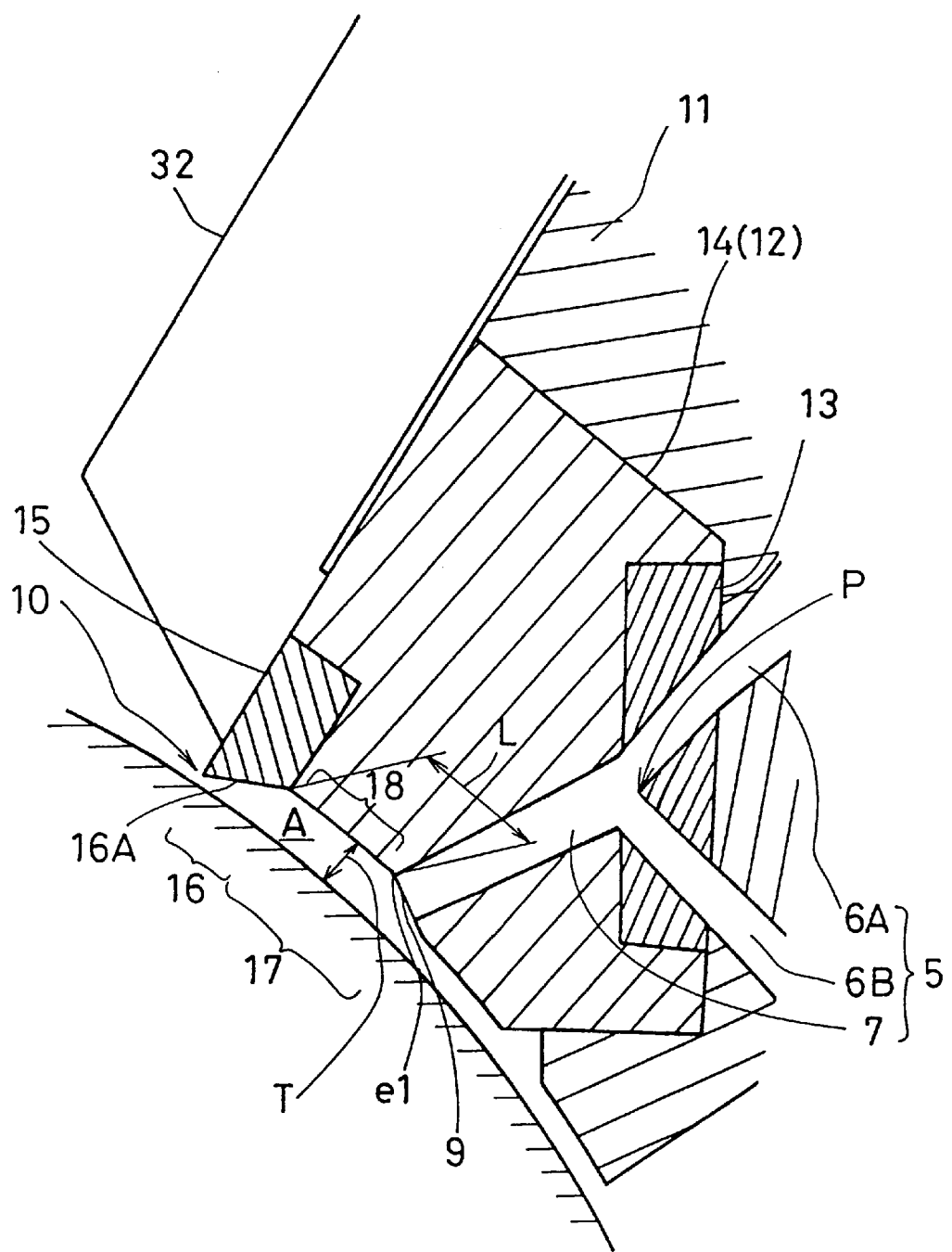
FIG. 3 (A) is a sectional view showing the passage arrangement and the extruding space.
Figure 3B:
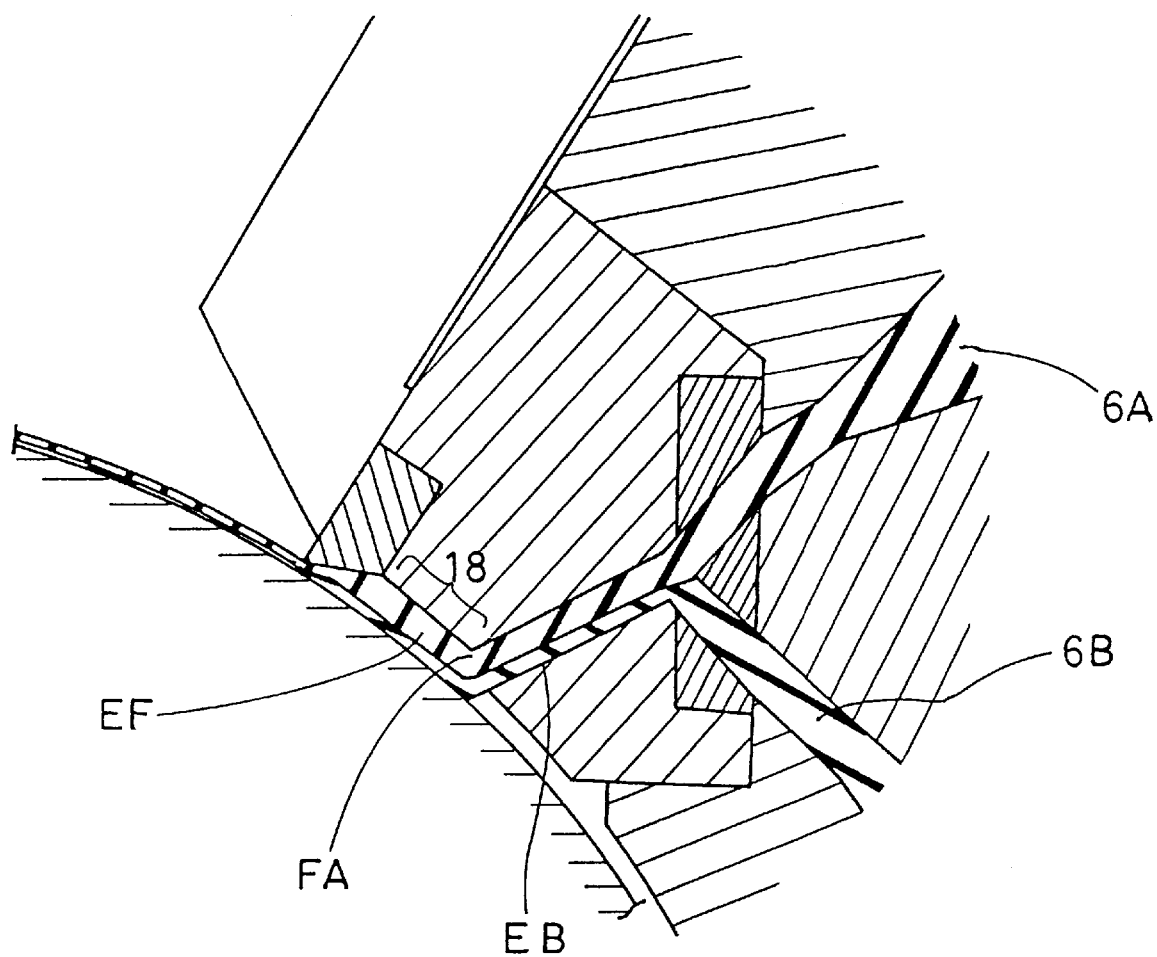
Figure 4:
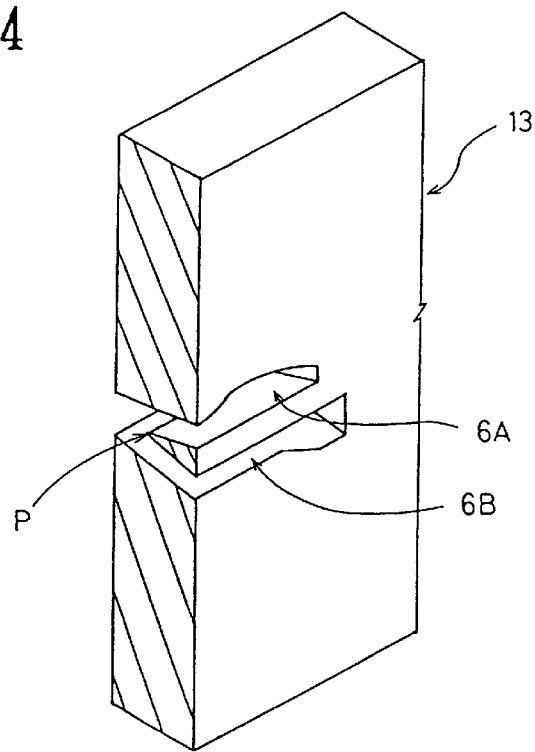
FIG. 4 is a perspective view showing a preformer die.

The passage arrangement 5 in this embodiment comprises, as shown in FIG. 3 (A), a first individual passage 6A connected to the first extruder 2A, a second individual passage 6B connected to the second extruder 2B, and a convergent passage 7 for joining the individual passages 6A, 6B. Therefore, the elastomeric materials EA, EB are mutually laminated from a convergent point P in the die set 12, and passes through the convergent passage 7.

In this way, the individual passages 6A, 6B are formed in the base part 11, and the convergent point P and convergent passage 7 are formed in the die set 12, and the extruding space A is formed between the die set 12 and the roller 4.

FIG. 3 (B) shows the flow state of elastomeric materials in the extruding space A.

The convergent point P and its vicinity are formed by a preformer die 13 fitted detachably to the rear end of a die main body 14. By the detachable structure of the preformer die 13 for determining the shape of the passage near the convergent point P, it is easier to set the extruding shape and dimensions of the elastomeric materials EA, EB, and adjust the passing speed in the passages 6A, 6B, and 7. As a result, the quality of the extruded products is much more stable.

The extruding space A accommodates a uniform chamber 17 in which the elastomeric materials flowing out from the opening 9 advances in the rotating direction together with the roller 4, into a finishing chamber 16 contiguous with the uniform chamber 17 for forming the elastomeric materials substantially into a final sectional shape. The finishing chamber 16 is a tiny gap portion formed between a finishing die 15 attached to the die main body 14 and the roller 4, and in this embodiment, an extruding end 10 for determining the product shape is fitted at the front end of a slant reducing portion 16A, decreasing the sectional height toward the rotating direction (extruding direction).

In this embodiment, a clasp 32 for stopping the die main body 14 and the finishing die 15 is provided in the base part 11 of the head 3.

Figure 2:
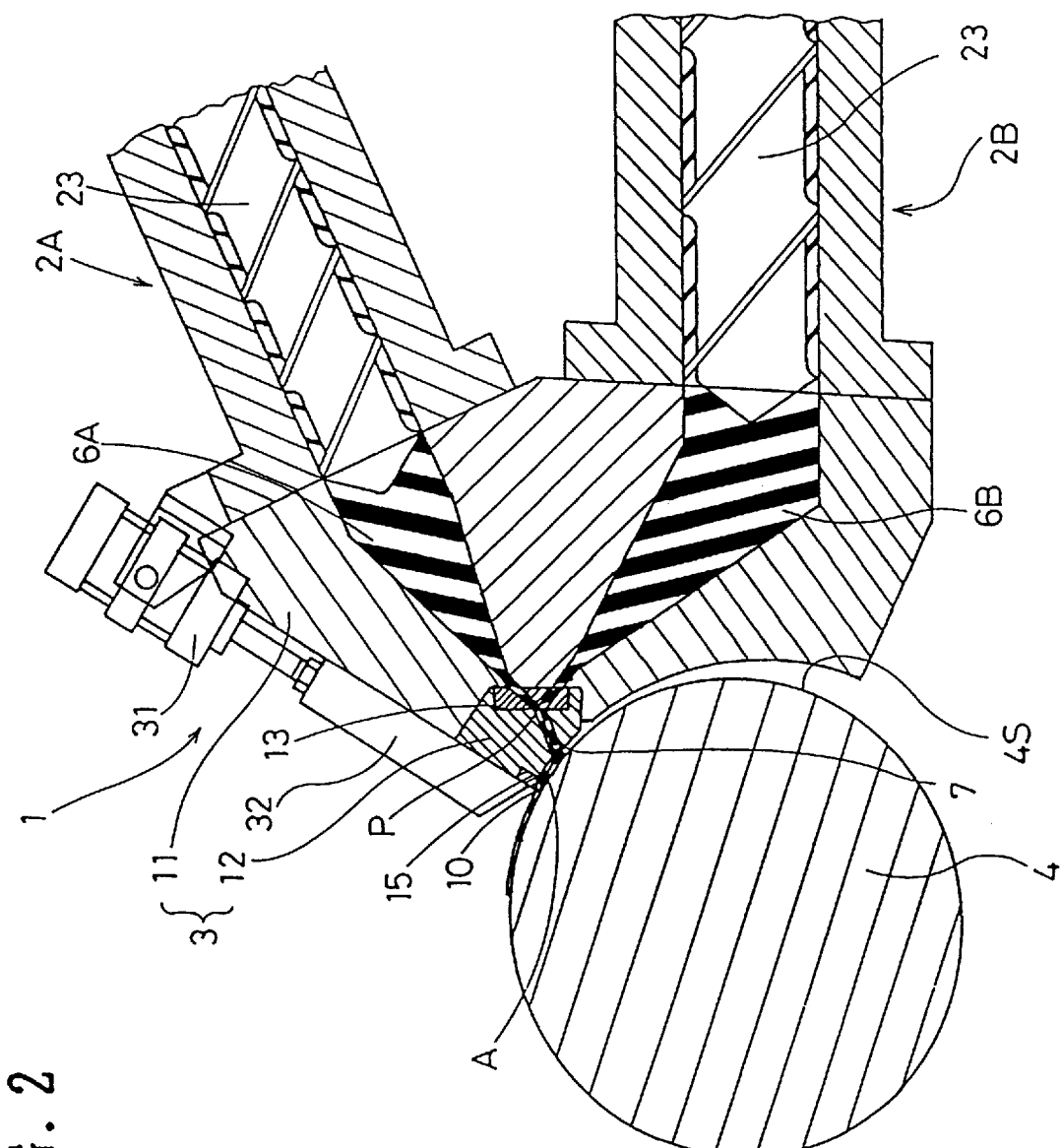
FIG. 2 is a sectional view showing the head and roller of the extruding apparatus.

The clasp 32 is fitted, as shown in FIG. 2, to the leading end of the rod of a cylinder 31 affixed to the base part 11, and the clasp 32 is moved back and forth by expansion and contraction of the rod. By expansion of the rod, the clasp 32 abuts against the outward surfaces of the finishing die 15 and the die main body 14, and restrains both the finishing die 15 and the die main body 14. By partially contracting the rod, only the finishing die 15 can be dismounted. By fully contracting the rod, the die main body 14 can be dismounted together with the finishing die 15 and the preformer die 13.

Figure 6:
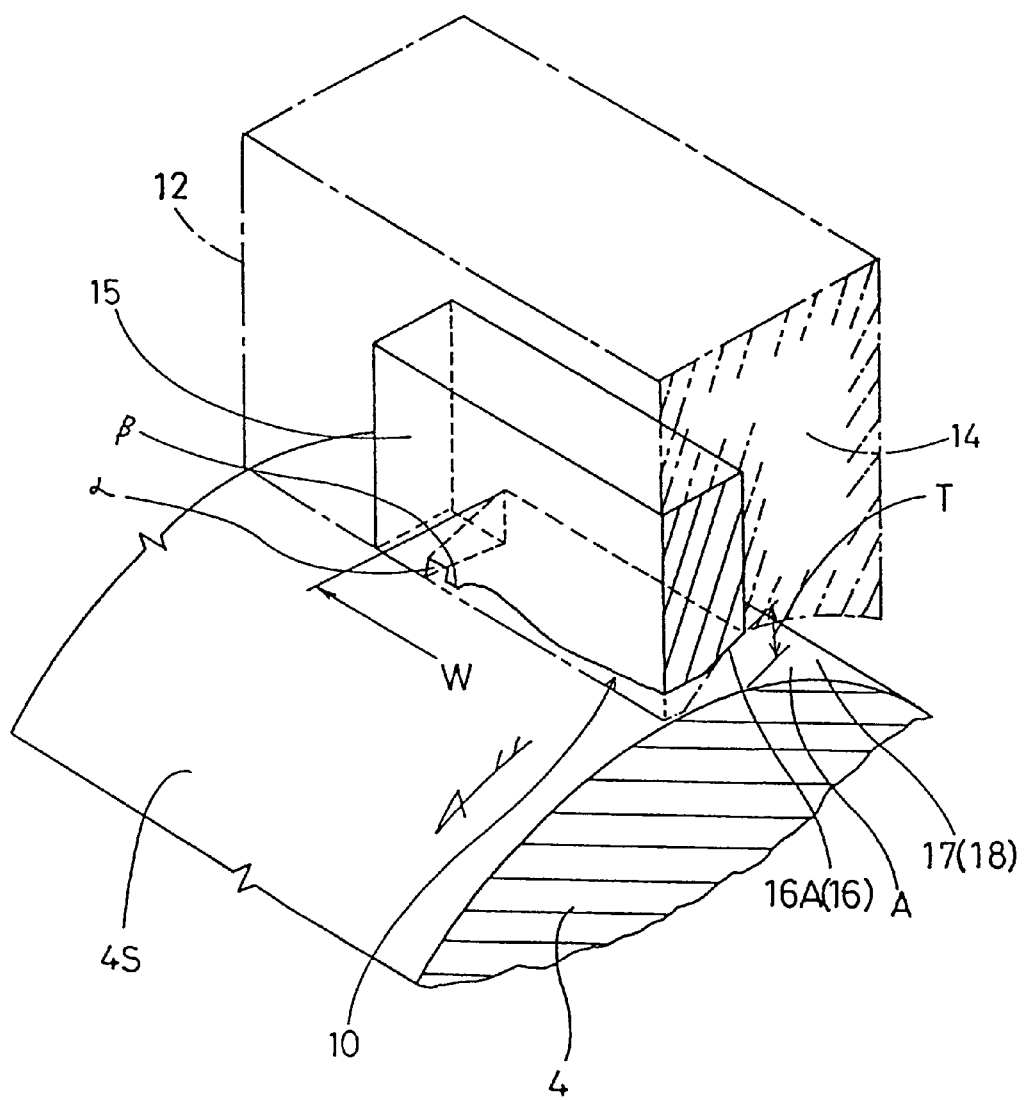
FIG. 6 is a perspective view showing a finishing chamber.

The roller 4 has a columnar part having a length exceeding the maximum width W in the axial direction of the extruding space A as shown in FIG. 6, and maintains a constant clearance from the die set 12. In this embodiment, the columnar part is provided nearly in the entire region of the roller 4, and hence the roller 4 is formed in a right circular cylinder. The roller 4 in this embodiment is driven and rotated in the counterclockwise direction, that is, to the left in FIG. 1.

Moreover, as shown in FIG. 3 (A), the uniform chamber 17 of the extruding space A has a principal part 18 provided between the edge e1, in the extruding direction, of the opening 9 and the reducing part 16A of the finishing chamber 16, and this principal part 18 is substantially uniform in sectional shape over its entire length.

Therefore, the elastomeric material EA passing through the first individual passage 6A from the first extruder 2A and the elastomeric material EB passing through the second individual passage 6B from the second extruder 2B converge at the point P. At the downstream side of the convergent point P, after being laminated, the laminate material EF passes through the convergent passage 7, and is extruded from the opening 9 into the extruding space A.

The laminate material EF flowing into the extruding space A, in a mutually laminated state of the elastomeric materials EA, EB, passes through the uniform chamber 17, and is finally formed in the finishing chamber 16, thereby forming an elastomeric product EG.

Figure 8:
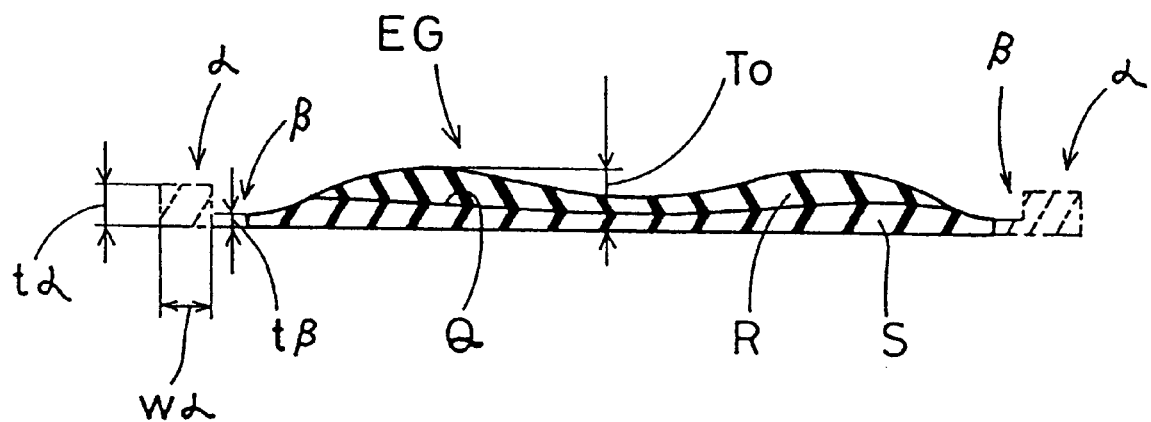
FIG. 8 is a sectional view showing an elastomeric product formed by the apparatus.
Figure 9:
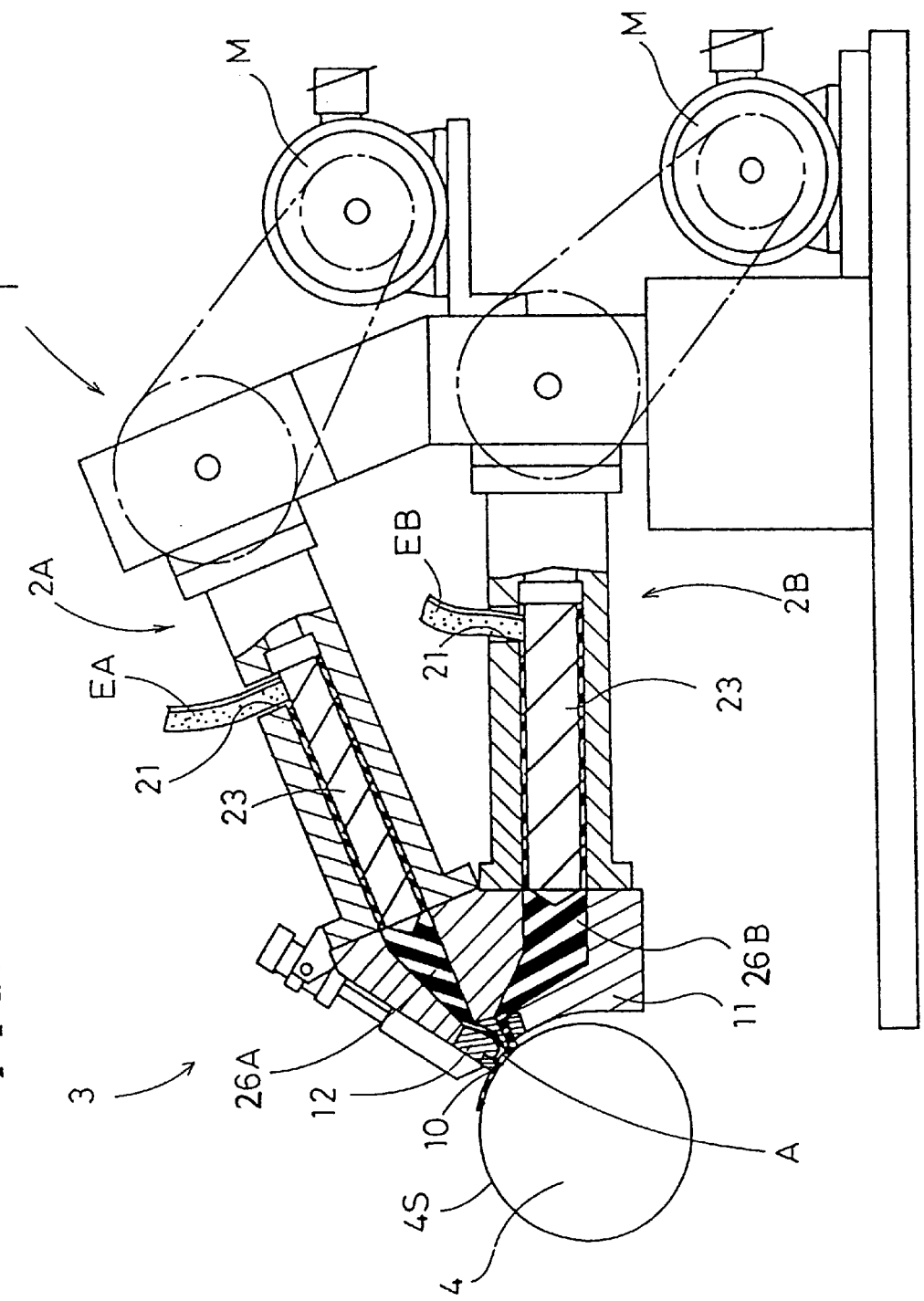
FIG. 9 is a front view showing an elastomeric extruding apparatus in a second embodiment of the present invention.
Figure 10:
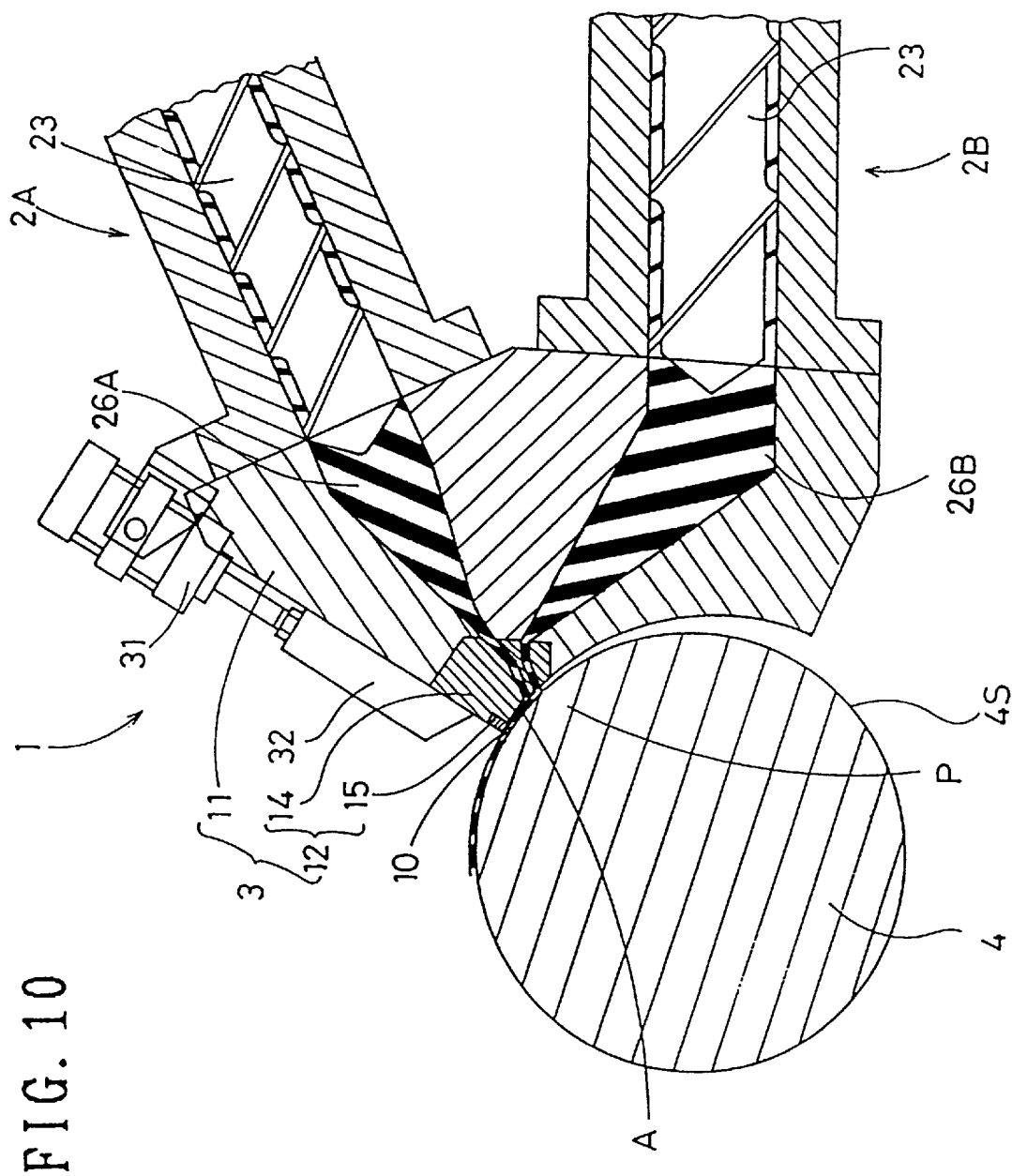
FIG. 10 is a sectional view showing the head and the roller of the second embodiment.

The elastomeric product EG in this embodiment is a tire member, for example, and inner-liner rubber formed by laminating together two kinds of elastomeric materials differing in properties as shown in FIG. 8, in the form of a thin band of an elastic body. The band has a maximum thickness T0 of about 2.0 mm.

The upper layer R is formed by the first extruder 2A, and the lower layer S by the second extruder 2B. Incidentally, if the volume of the lower layer S is greater as compared with the upper layer R, the screw shaft 23 of the second extruder main body 2B is designed larger than that of the first extruder 2A.

In the individual passages 6A, 6B, the sectional shape of the passage is varied in the downstream direction, and the elastomeric materials EA, EB are formed roughly while passing through the individual passages 6A, 6B.

Figure 7A:
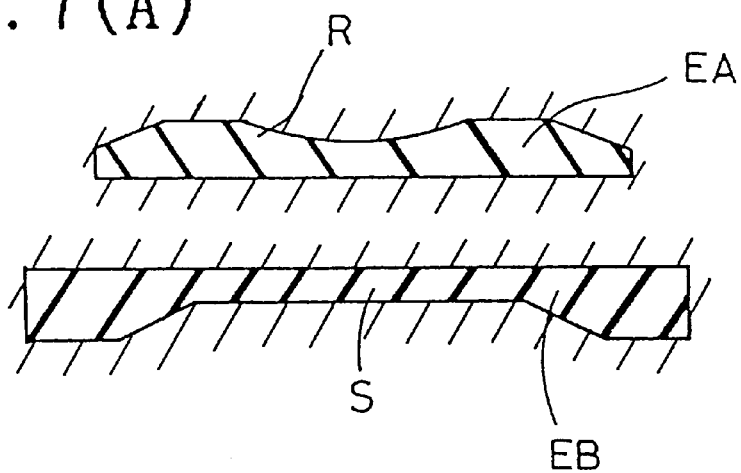
FIG. 7 (A) is a sectional view showing a sectional shape of elastomeric material in an individual passage.
Figure 7B:
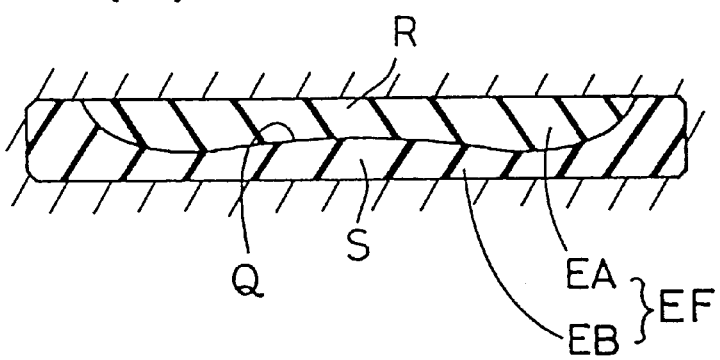
Figure 7C:
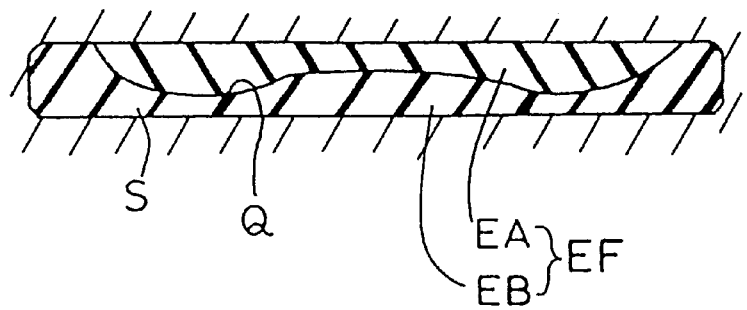

FIGS. 7(A), 7(B), 7(C) show changes in the sectional shape of the elastomeric materials in each passage.

FIG. 7(A) shows the sectional shape of the elastomeric materials EA, EB when passing the inlet portion of the die set 12 of the individual passages 6A, 6B. At this time, the elastomeric materials EA, EB are preformed in a sectional shape determined by the ratio of the thicknesses occupying in the product.

FIG. 7 (B) shows the sectional shape of the elastomeric materials EA, EB when passing the convergent passage 7. In the convergent passage 7, the elastomeric materials EA, EB are laminated under the internal pressure applied by the extruder, and hence the boundary surface Q of the laminate material EF is strongly adhered together.

FIG. 7 (C) shows the sectional shape of the laminate material EF in the uniform chamber 179 and in this embodiment it is nearly same as the sectional shape at the opening 9 of the convergent passage 7.

Figure 5:
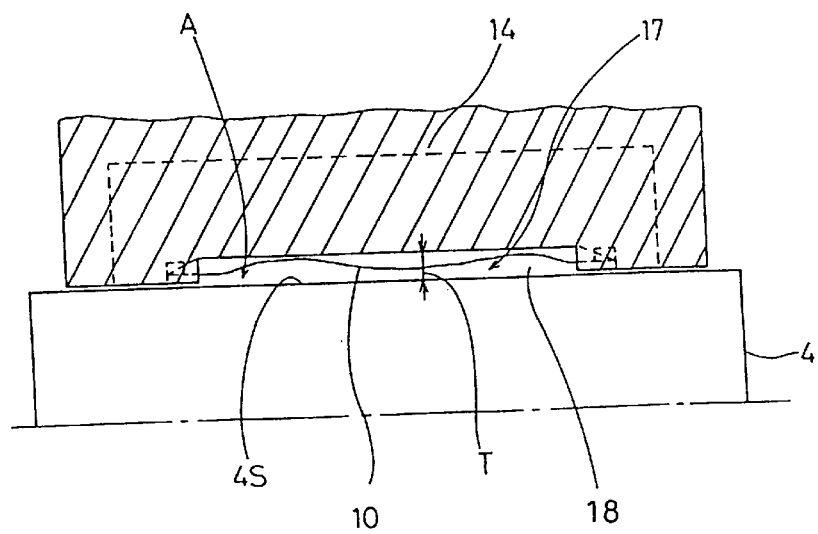
FIG. 5 is a sectional view showing a uniform chamber.

Since one side (lower side) of the uniform chamber 179 as shown in FIG. 5, is formed of an outer circumference 4S of the roller 4, the laminate material EF runs as being pulled by the rotation of the roller 4. At this time, since the uniform chamber 17 has a uniform sectional shape and extends in the length L more than 1.5 times the sectional height T of the principal part 18, the passing resistance receiving from the other side (upper side) is lessened while passing through the uniform chamber 17. As a result, the feed speed between the elastomer materials EA, EB is nearly the same, and the laminate material EF enters from the uniform chamber 17 into the finishing chamber 16 in stable condition, whereby the distortion at the boundary surface Q may be further suppressed.

The tensile force of the roller 4 properly acts over the entire length of the uniform chamber 17, and it functions as a pushing force. As a result, while suppressing the inner pressure of the apparatus, it is possible to extrude the elastomeric materials easily from the extruding end 10. Moreover, by the reduction of the internal pressure of the apparatus, the expansion of the elastomeric product EG due to the reduction in pressure after extrusion from the extruding end 10 is reduced.

That is, shape changes due to expansion are small, and the elastomeric product EG of high quality, excellent in dimensional precision and adhesive force is provided. This reduction of internal pressure in the apparatus, also contributes to a decline in the internal temperature, and thus rubber scorching can be prevented, material properties are maintained in a favorable state, and the dimensional stability is improved.

In this embodiment, the length L of the principal part 18 of the uniform chamber 17 is 1.5 or more of the sectional height T of the principal part 18, so as to exhibit an effective tensile force on the laminate material EF. If less than 1.5 times, such effect may not be expected. The upper limit of the length L is preferred to be 150 mm or less. If greater, further improvement of the effect cannot be expected, but the head 3 becomes larger in size, and the cost increases, and the working efficiency drops. More preferably, it should be 100 mm or less.

Incidentally, in this embodiment, in the shape of the extruding end 10 of the finishing die 15, as shown in FIG. 6, a bulge $\alpha$ is formed through a thin wall portion $\beta$ at both sides in the width direction.

As the elastomeric material passes through the finishing die 15, it is extruded into a shape including bulges $\alpha$ and thin wall portions $\beta$, as indicated by the single dot chain line in FIG. 8. By cutting the thin wall portion $\beta$ by a knife or other cutting tool, the width dimension of the elastomeric product EG can be precisely formed.

The width dimension W$\alpha$ of the bulge $\alpha$ is preferred to be 5 to 25 mm, and if less than 5 mm, it is likely to be torn off when removing the bulge $\alpha$, or if exceeding 25 mm, the removed elastomer increases and the weight of the elastomeric materials EA, EB increases when extruding, and hence it is disadvantageous to the working efficiency.

The thickness t$\beta$ of the thin wall portion $\beta$ is preferred to be 2.5 mm or less when considering the ease of cutting. The height t$\alpha$ of the bulge $\alpha$ is preferably 1.5 times to 5.0 times the thickness t$\beta$, and if less than 1.5 times the thickness t$\beta$, the bulge $\alpha$ is likely to be torn off when removing, and if it exceeds 5.0 times the thickness t-beta, the yield of the elastomeric material increases, and the working efficiency drops.

Figure 16:
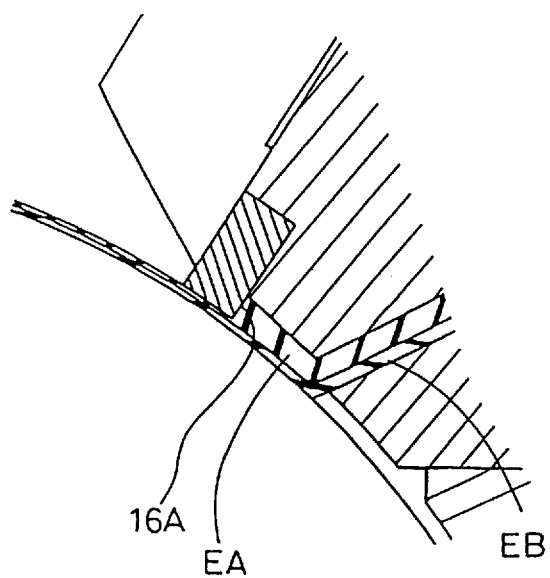
FIG. 16 is a sectional view showing other embodiments of the finishing chamber.

In the present invention, in order that the tensile force produced by the roller 4 may act appropriately so that the elastomer may easily pass the finishing chamber 16, as shown in FIG. 16, the reducing part 16A of the finishing chamber 16 may be formed in a steep slant or a step.

A second embodiment of the elastomeric extruding apparatus 1 is illustrated in FIG. 9 to FIG. 15 (C).

Figure 11A:
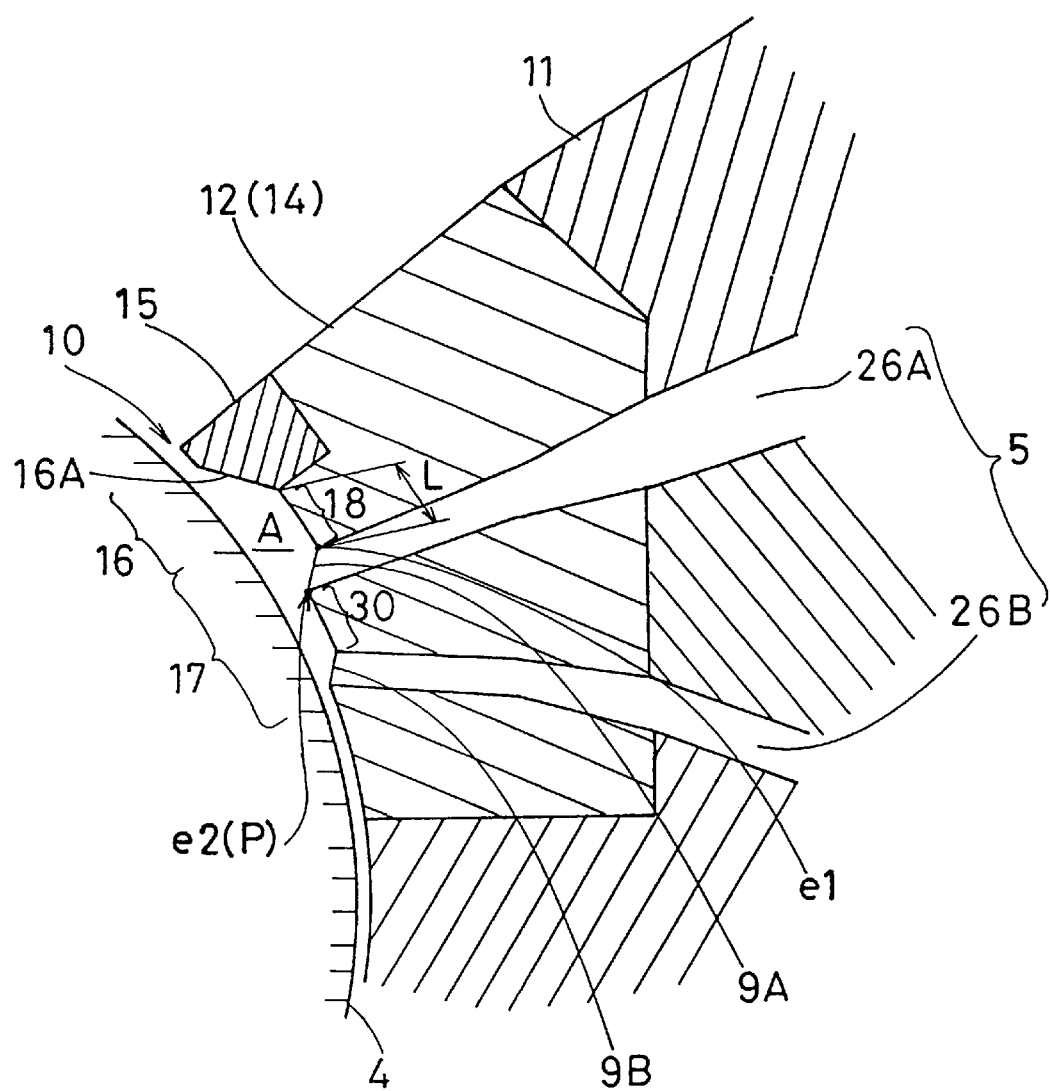
FIG. 11 (A) is a sectional view showing a passage arrangement and extruding space of the second embodiment.
Figure 11B:
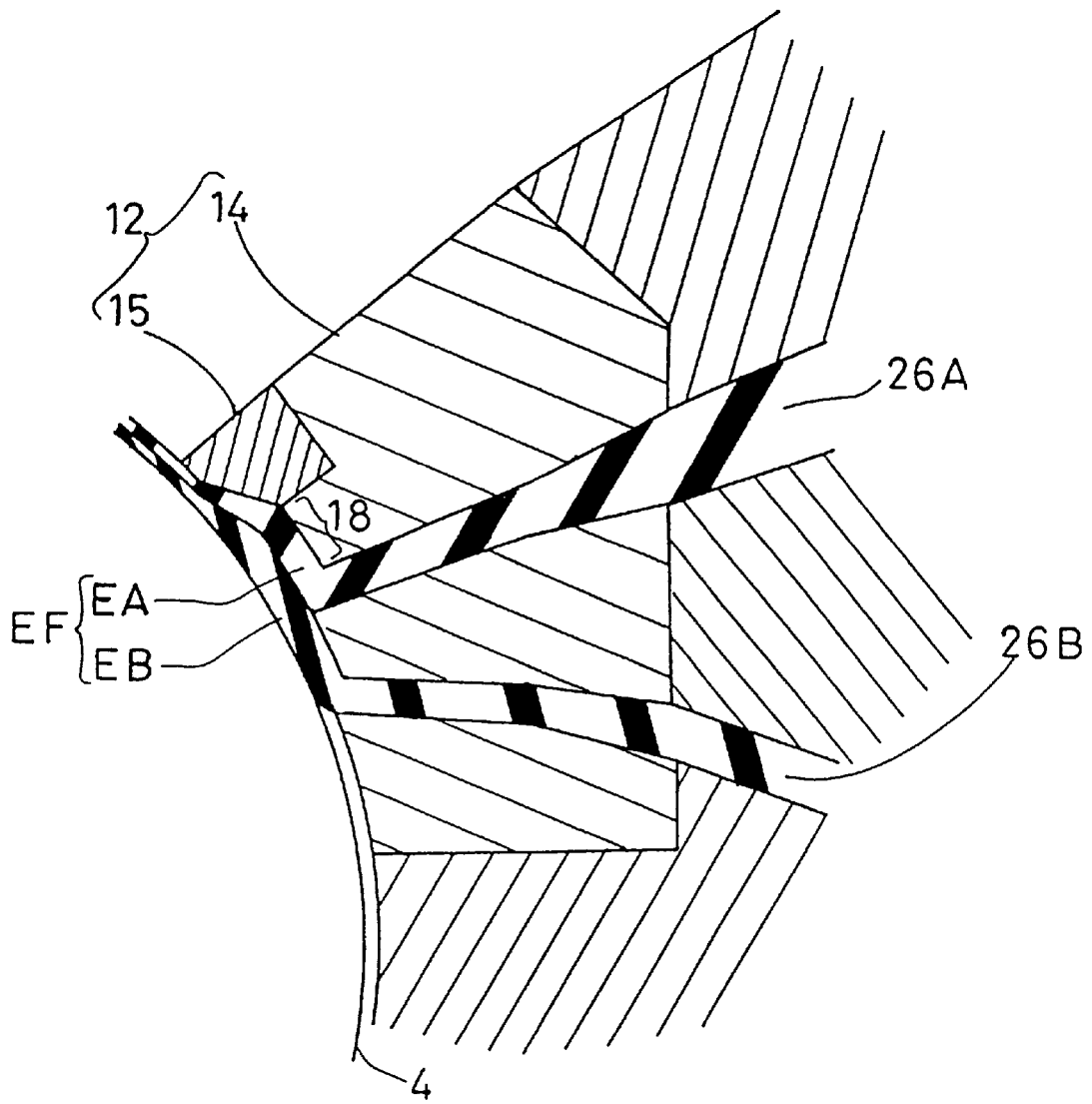
Figure 12:
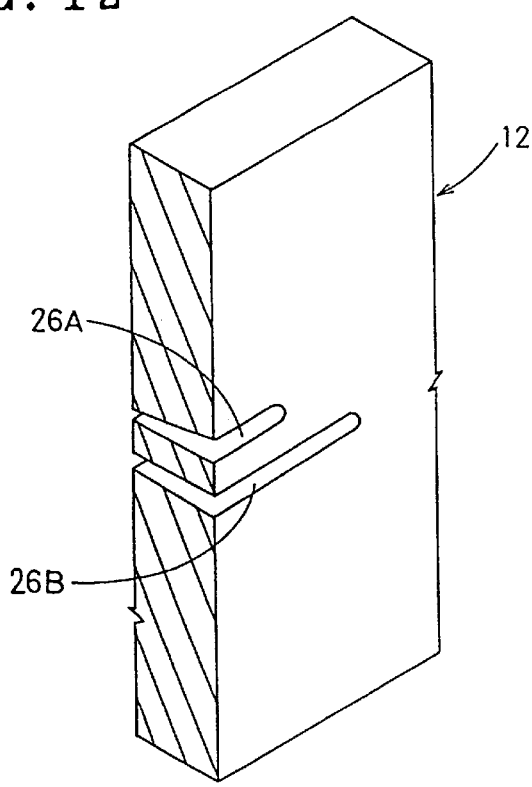
FIG. 12 is a perspective view showing a die set of the second embodiment.

As shown in FIG. 11 (A), in the elastomer extruding apparatus 1, the passage arrangement 5 is composed only of the individual passages 26A, 26B for individually passing the elastomeric materials EA, EB extruded from the extruders 2A, 2B. The individual passages 26A, 26B extend while penetrating through the base part 11 and the die set 12, and openings 9A, 9B are formed at the front end so as to open against the roller 4 and communicate with the extruding space A.

The die set 12 is composed of the die main body 14 for forming the individual passages 26A, 26B and the uniform chamber 17, and the finishing die 15 for forming the finishing chamber 16.

The uniform chamber 17 in the extruding space A has a principal part 18 between the opening closer to the finishing chamber 16 among the openings 9A, 9B, in this embodiment, between the opening 9A and the finishing chamber 16. More specifically, the principal part 18 is formed from the edge e1, in the extruding direction, of the opening 9A to the reducing part 16A same, as in the preceding embodiment, and this principal part 18 is substantially uniform in sectional shape over its entire length.

Moreover, in the uniform chamber 17, another edge e2 of the opening 9A forms a convergent point P where the elastomeric materials EA, EB converge. In this embodiment, by forming a clearance between the openings 9A, 9B, the uniform chamber 17 has a guide path 30 for connecting the opening 9B and the principal part 18, between the convergent point P and opening 9B.

Therefore, the elastomeric materials EA, EB extruded from the first and second extruders 2A, 2B pass through the individual passages 26A, 26B, and meet at the convergent point P in the uniform chamber 17, and then pass through the principal part 18 while laminating.

Figure 15A:
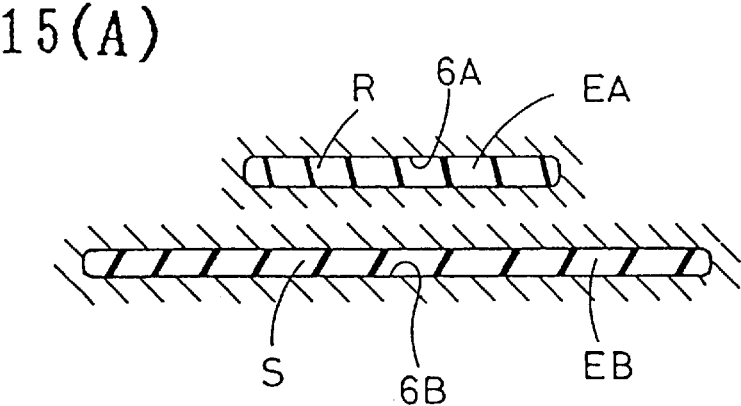
FIG. 15 (A) is a sectional view showing a sectional shape of elastomeric material in an individual passage of the second embodiment.
Figure 15B:
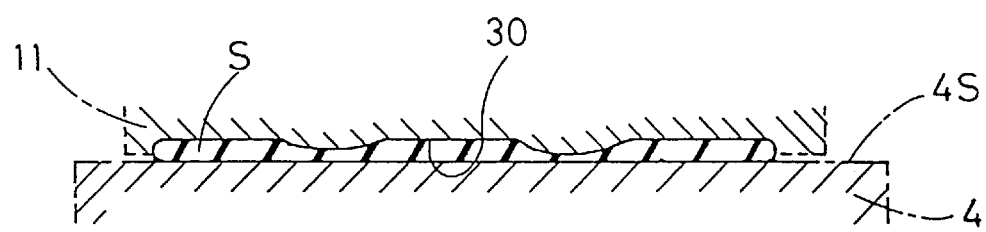
Figure 15C:
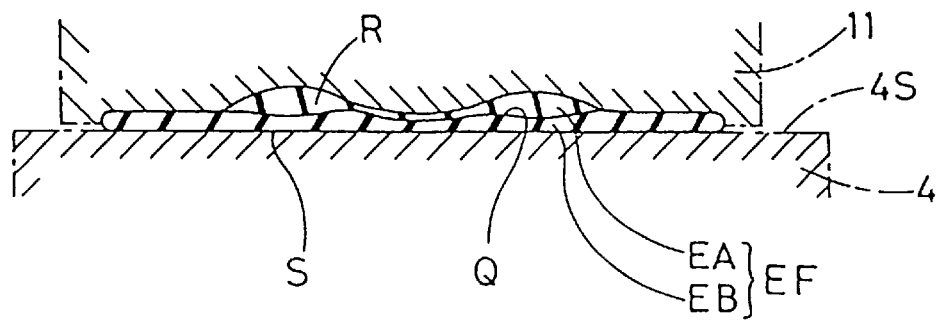

FIGS. 15(A), 15(B), 15(C) show the change of sectional shape of the elastomeric materials in each passage.

FIG. 15(A) shows the sectional shape at the inlet portion of the die main body 14. Herein, the elastomeric materials EA, EB are formed in a flat rectangular section, and it is further reduced while passing through the die main body 14.

FIG. 15(B) shows the sectional shape of the elastomeric material EB when passing through the guide path 30. In this guide path 30, it is preformed into a sectional shape determined in consideration of the ratio of the thickness of the elastomeric materials EA, EB occupying the product, that is, a shape similar to the sectional shape of the elastomer EB in the product. This preforming may be done at any position in the convergent point P, guide path 30, opening 9B, or near the leading end of the individual passage 26B if it is upstream of the convergent point P.

FIG. 15 (C) shows the sectional shape of the laminate material EF in the principal part 18. At the convergent point P, the elastomeric material EB flowing in the guide path 30 is laminated with the elastomeric material EA flowing in the first individual passage 26A. The sectional shape of the elastomeric material EA is also preformed at the upstream of the convergent point P, for example, in the opening 9A or near the leading end of the individual passage 26A, and is then laminated.

Thus, in the second embodiment, the preformed elastomeric material EA is placed on the elastomeric material EB provided with motion from the roller by passing through the guide path 30, and the laminate material EF is formed. That is, under the effect of the roller 4, the elastomeric materials are laminated, and hence the distortion of the boundary surface Q is suppressed as compared with the case of placing the preliminarily joined laminate material EF under the effect of the roller 4.

Since the uniform chamber 17 has a uniform sectional shape, the passing resistance received from the head 3 is lessened, and the feed speed of the elastomeric materials EA, EB is nearly same, and moreover the changes of flow direction near the inlet of the finishing chamber 16 are also prevented, so that the distortion of the boundary surface Q may be further suppressed.

As in the first embodiment, the tensile force by the roller 4 also functions effective as an extruding force in the second embodiment, so that the internal pressure of the apparatus can be set low.

Figure 13:
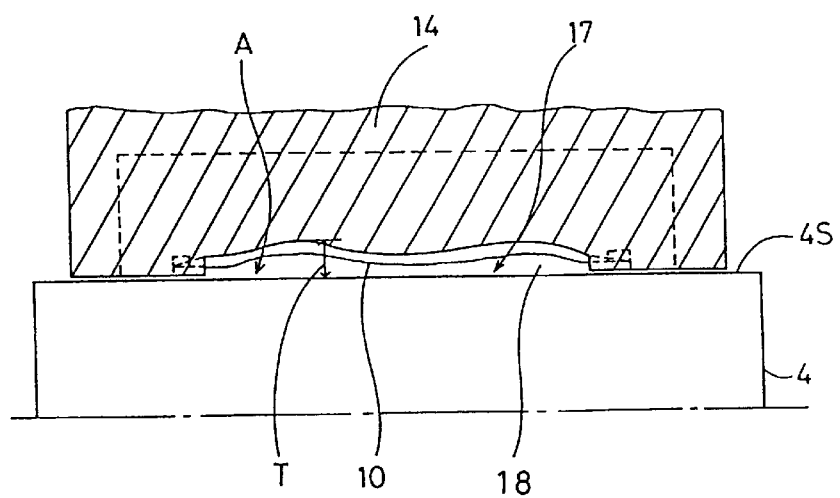
FIG. 13 is a sectional view showing a uniform chamber of the second embodiment.
Figure 14:
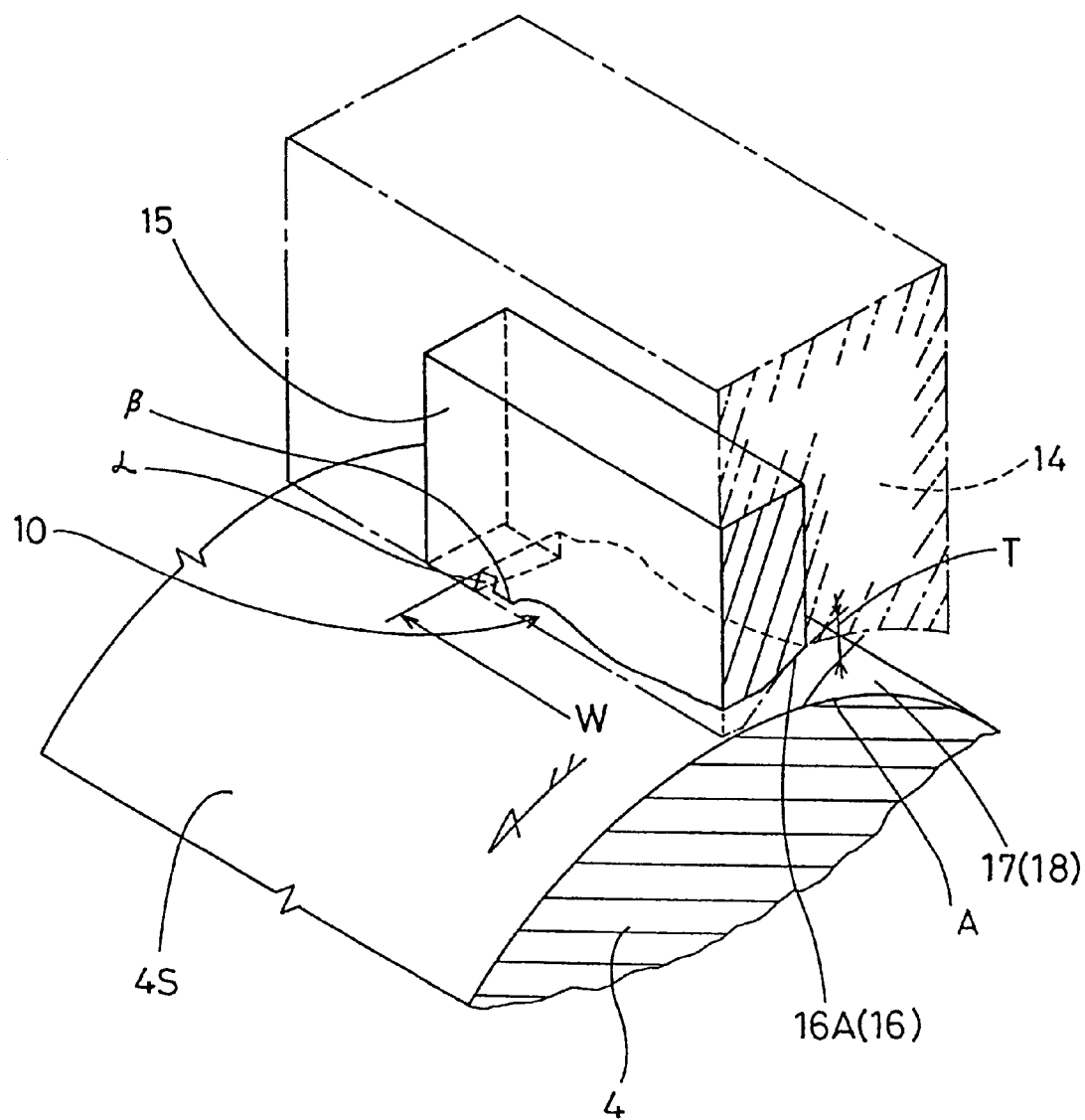
FIG. 14 is a perspective view showing a finishing chamber of the second embodiment.

The length L of the principal part 18 of the uniform chamber 17 is, as in the first embodiment, 1.5 or more of the sectional height T of the principal part 18, but the principal part 18 in this embodiment is not a rectangular shape as shown in FIG. 15 (C), and hence the maximum height of the section is adopted as the sectional height T as shown in FIG. 13.

Figure 17:
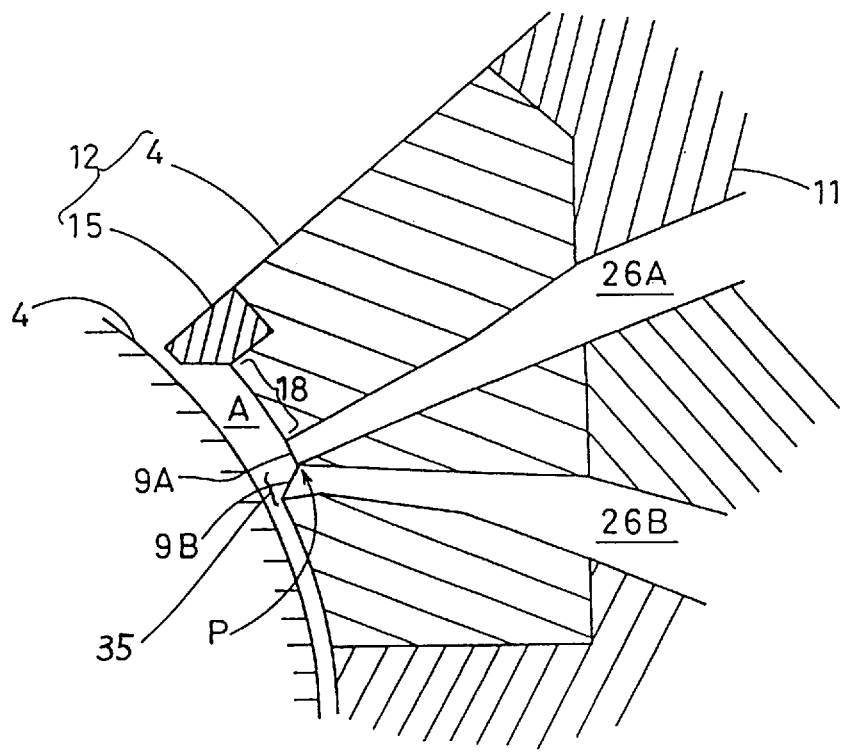
FIG. 17 is a sectional view showing other embodiment of the individual passages.
Figure 18:
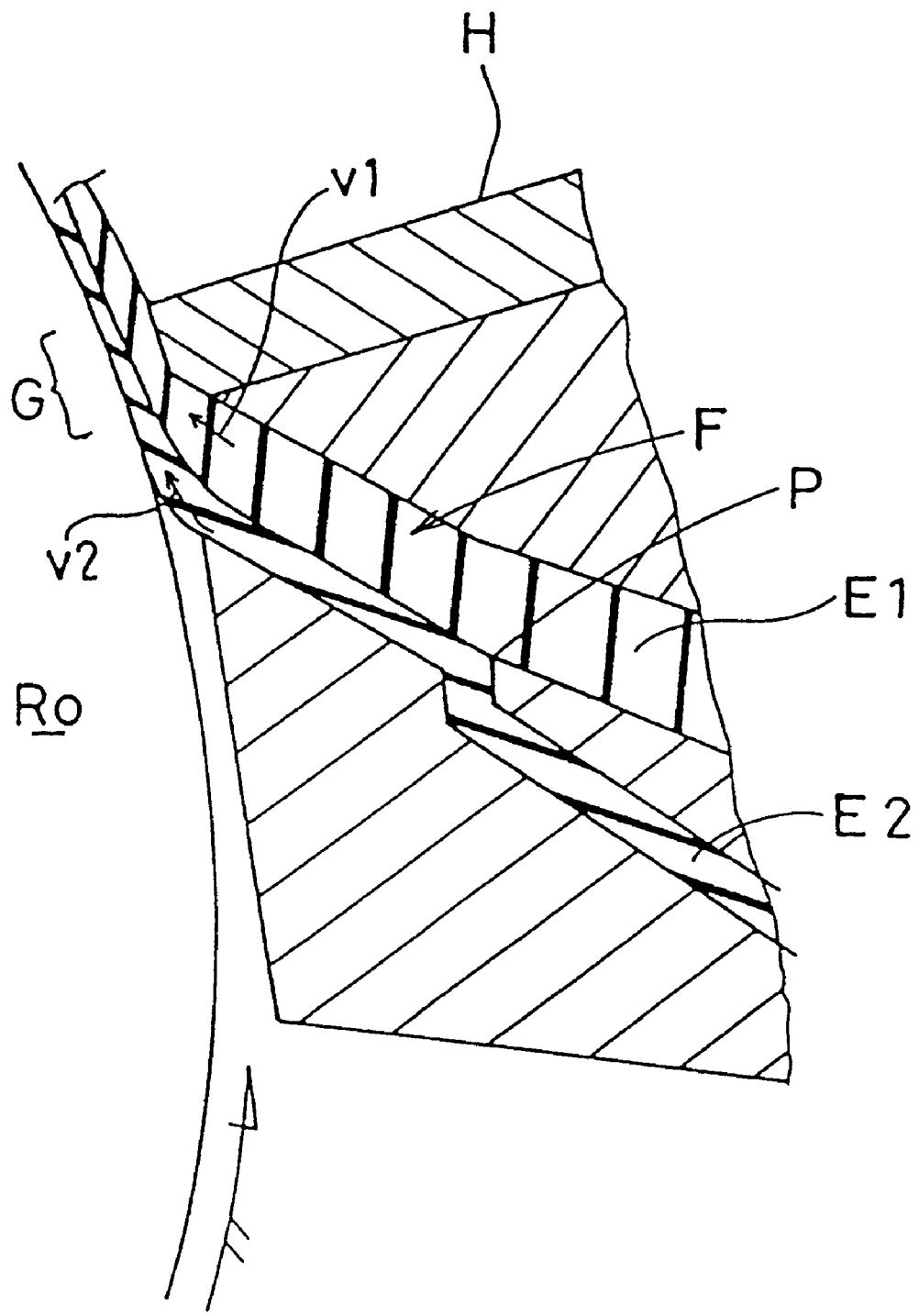
FIG. 18 is a sectional view showing a prior art.

Incidentally, other embodiments of the individual passages 26A, 26B is shown in FIG. 17. In the diagram, the first and second individual passages 26A, 26B are adjacent to each other without clearance at the convergent point P, and the guide path 30 is omitted. Also in this case, since the elastomeric material EB in the individual passage 26B precedes the elastomeric material EA by at least a distance 35 so as to contact with the roller 4, the elastomeric material EB is provided with the motion, thereby suppressing the distortion of the boundary surface Q.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elastomeric extruding apparatus which comprises:

a head containing a plurality of passages, a plurality of extruders communicating with the passages in said head, and a rotatable driven roller disposed at the front end of said head, said roller and said head defining an extruding space therebetween which communicates with at least one opening to said passages, wherein the extruding space defines at least a uniform chamber which extends continuously and smoothly into a finishing chamber of gradually reducing sectional dimension whereby the elastomeric material flowing from the opening is advanced in the rotating direction together with the roller through the uniform chamber and the finishing chamber for forming the elastomeric materials into a final sectional shape, and said uniform chamber has a major portion having a substantially uniform sectional space and extending by a length being at least 1.5 times a sectional height of the major portion.

2. The elastomeric extruding apparatus of claim 1, wherein the uniform chamber has a major portion having a substantially uniform, sectional shape and which extends from the passage opening to the finishing chamber.

3. The elastomeric extruding apparatus of claim 2, wherein the major portion of the uniform chamber has a length (L) which is at least 1.5 times a sectional height (T) of the major portion.

4. The elastomeric extruding apparatus of claim 1, wherein the plurality of passages in the head comprises individual passages through which the elastomeric materials are individually conveyed, and one convergent passage which extends from a convergence point of said plurality of individual passages, and through which the elastomeric materials of the individual passages pass while being laminated and converged to said opening.

5. The elastomeric extruding apparatus of claim 1, wherein the plurality of passages in the head comprises individual passages through which the elastomeric materials are individually conveyed, each of the plurality of individual passages having a corresponding opening communicating with the extruding space.

6. The elastomeric extruding apparatus of claim 4, wherein the head comprises a base part for forming the individual passages, and a die set for forming the convergence point, the convergent passage, and the extruding space.

7. The elastomeric extruding apparatus of claim 6, wherein the die set comprises a preformer die for forming the convergent point, a die main body for forming the convergent passage and uniform chamber, and a finishing die for forming the finishing chamber.

8. The elastomeric extruding apparatus of claim 5, wherein the head comprises a base part for forming the individual passages, and a die set comprising a die main body for forming a part of the individual passages and a uniform chamber, and a finishing die for forming the finishing chamber.

9. The elastomeric extruding apparatus of claim 5, wherein the major portion of the uniform chamber is disposed between the finishing chamber and the opening closest to the finishing chamber among the openings of said plurality of individual passages.

10. The elastomeric extruding apparatus of claim 5, wherein the extruding space further contains a guide path disposed upstream of said uniform chamber and wherein one of said individual passages has an opening which communicates with said guide path and another of said individual passages has an opening which communicates with said uniform chamber.

* * * * *